United States Patent
Roman

(10) Patent No.: US 8,018,181 B2
(45) Date of Patent: Sep. 13, 2011

(54) METHOD AND APPARATUS FOR ACHIEVING INHERENT IGNITION VOLTAGE IN OPERATION OF A HIGH INTENSITY DISCHARGE LAMP

(75) Inventor: Daniel Roman, Richmond Hill (CA)

(73) Assignee: 2197611 Ontario Inc., Richmond Hill (CA)

( * ) Notice: Subject to any disclaimer, the term of this patent is extended or adjusted under 35 U.S.C. 154(b) by 394 days.

(21) Appl. No.: 12/370,538

(22) Filed: Feb. 12, 2009

(65) Prior Publication Data

US 2010/0201287 A1    Aug. 12, 2010

(51) Int. Cl.
  *G05F 1/00*    (2006.01)
(52) U.S. Cl. .................................. 315/307; 315/291

(58) Field of Classification Search .................. 315/224, 315/291, 307–309, DIG. 5
See application file for complete search history.

(56) References Cited

U.S. PATENT DOCUMENTS

| | | | | |
|---|---|---|---|---|
| 6,160,362 A * | 12/2000 | Shone et al. | ................... | 315/308 |
| 7,411,360 B2 * | 8/2008 | Henry | ........................... | 315/307 |
| 7,692,392 B2 * | 4/2010 | Takeuchi | ...................... | 315/307 |

* cited by examiner

*Primary Examiner* — Don P Le
(74) *Attorney, Agent, or Firm* — Gowling Lafleur Henderson LLP

(57) ABSTRACT

A high intensity discharge lamp, such as a high power sodium or metal halide lamp, having an electronic ballast. The electronic ballast may incorporate resonance-based circuitry for achieving an ignition state via a frequency sweeping step, the particular ignition voltage being inherent to the operational state of the high intensity discharge lamp. The operating state of the lamp may be sensed in order to apply power and voltage levels appropriate for steady state operation.

18 Claims, 4 Drawing Sheets

METHOD AND APPARATUS FOR ACHIEVING INHERENT IGNITION VOLTAGE IN OPERATION OF A HIGH INTENSITY DISCHARGE LAMP

FIELD OF THE INVENTION

The present invention relates generally to high intensity discharge lamps, including high power sodium and metal halide lamps, using an electronic ballast.

BACKGROUND OF THE INVENTION

High Intensity Discharge (HID) lamps are high-efficiency lamps used to generate high levels of lighting from a relatively small source, especially for industrial and infrastructure lighting applications. The term "HID lamp" may include mercury vapor lamps, metal halide lamps, and high pressure sodium lamps. Metal halide lamps, for instance, are commonly used in large spaces that require a high level of brightness at relatively low cost.

Typical construction of a HID lamp comprises a pair of electrodes, constructed of a refractory metal such as tungsten, enclosed within an arc bulb containing a pressurized gas. In steady operation of the HID lamp, light is generated by the hot gas creating a plasma discharge when an electrical current is conducted through the gas, between the electrodes.

To initiate the arc between the electrodes, the gas must first be ionized. This is typically done at the lamp ignition stage, such as via a high voltage spike, up to and even exceeding 5 kV in magnitude, between the electrodes. The ignition state being reached is characterized by a transitory phase of intense luminous output and heat generated from the plasma discharge by passage of electric current through the pressurized gas between the electrodes.

HID lamps typically require an electrical ballast for providing electrical power for the operation of the lamp, including both ignition state and subsequent steady state operation. Due to the varying voltage requirements associated with the progressive stages in operating the HID lamp, the electrical ballast circuitry needs to tailor the voltage protocols accordingly. For instance, just prior to ignition, when the electrodes are cold, a sufficiently strong voltage must be applied to generate thermionic emission, where electrons are lifted off the surface of the electrodes. Electrical ballast circuitry regulates the flow of current to facilitate ignition and subsequent steady state operation of the lamp. Circuitry components of the ballast, in addition to inductive and resistive components, may include a transformer with an ignition component to drive the lamp to an ignited state. Once the lamp transition out of the ignition state, the ballast then reduces the voltage applied to the lamp while increasing the lamp current. Thereafter, the current is regulated for the lamp to operate in steady state.

Certain drawbacks or adverse consequences are associated with achieving lamp ignition via the sudden, almost discontinuous nature of the high voltage spike. Sputtering at the electrodes produces particulate removal and scattering of the electrode surface material, changing the geometry of the electrode tips, and degrading the electrode characteristics cumulatively each time a high voltage ignition spike is applied to the lamp. With time, that particulate material condenses on, and darkens, the inner surface of the lamp. Since the electrodes play a significant role in initial striking of the electrical arc and in determining the luminosity of the lamp, light transmission efficiency and lamp performance degrades as the lamp darkens. The temperature of the lamp tube may be higher in steady state operation, also, effectively decreasing the useful life of the lamp. It is also commonplace practice for lamp installers to over-specify the lamp wattage for a given the application, typically by around 30%, in anticipation of lamp darkening and lessened lighting efficiency over the life of the lamp; obviously a wasteful, though rational, practice.

SUMMARY OF THE INVENTION

In accordance with one aspect of the invention there is provided a method of operating an electronic ballast of a high intensity discharge lamp to achieve ignition in the lamp, the method comprising: selecting a starting frequency for a sweep frequency generator electrically coupled to a resonant ignition network of the electronic ballast; and starting generally from the starting frequency, operating the sweep frequency generator to apply a continuously decreasing frequency to the resonant ignition network, the resonant ignition network operable to provide electrical power to the lamp, until an ignition voltage sufficient to achieve ignition in the lamp is reached.

There is also provided a method further comprising, in response to achieving ignition, decreasing the ignition voltage to a steady state voltage level appropriate for steady state operation of the lamp.

In one embodiment, decreasing the ignition voltage is achieved by decreasing the frequency of the sweep frequency generator.

The method may further comprising: sensing ignition in the lamp; and decreasing the ignition voltage to a steady state voltage level appropriate for steady state operation of the lamp, in response to sensing ignition.

The one embodiment, sensing ignition comprises sensing a temperature level of the high intensity discharge lamp.

In another embodiment, sensing ignition comprises sensing a voltage change across at least one of a plurality of electronic components coupled to the lamp.

There is provided an electronic ballast for powering a high intensity discharge lamp, the electronic ballast comprising: a resonant ignition network operable to provide electrical power to the high intensity discharge, the resonant ignition network being arranged to include the electrical load of the lamp; and sweep frequency generator circuitry arranged to apply a continuously decreasing frequency to the resonant ignition network at least until an ignition voltage sufficient to achieve ignition in the lamp is reached.

In one embodiment, the resonant ignition network is further operable to decrease the ignition voltage level applied to the lamp in response to lamp ignition being reached, the decreased voltage level being appropriate for steady state operation of the lamp.

In another embodiment, decreasing the ignition voltage is achieved by decreasing the frequency of the sweep frequency generator as applied to the resonant ignition network.

In yet another embodiment, the frequency applied to resonant ignition network is decreased to a level generally around 120 kHz for steady state operation of the lamp.

There is provided an embodiment further comprising sensing circuitry arranged to sense when ignition in the lamp is achieved.

In a further embodiment, the sensing circuitry comprises a temperature sensing component to sense a temperature condition of the lamp that is indicative of lamp ignition being reached.

In yet another embodiment, the resonant ignition network is further operable to decrease the ignition voltage level to a decreased voltage level appropriate for steady state operation of the lamp in response to sensing lamp ignition being reached.

In another embodiment, the sweep frequency generator circuitry is arranged to apply a frequency that continuously decreases from a level starting generally around 200 MHz.

An optional embodiment is provided where the electronic ballast further comprises a multiplexing switch circuit for selecting any one of a plurality of lamp wattage levels.

There is also provided a high intensity discharge lamp module comprising: an electronic ballast for supplying an ignition voltage to energize a high intensity discharge to an ignited state; and a sweep frequency generator to apply a continuously decreasing frequency to a resonant ignition network of the electronic ballast, at least until an ignition voltage sufficient to achieve ignition of the lamp is reached.

In one embodiment, the sweep frequency generator comprises a voltage controlled oscillator.

In yet another embodiment, the frequency sweeping circuitry continuously decreases the frequency applied to the resonant ignition network from around 200 MHz to around 120 MHz.

BRIEF DESCRIPTION OF THE DRAWINGS

The invention will now be described by way of example only with reference to the following drawings in which.

DETAILED DESCRIPTION

Figure 1:
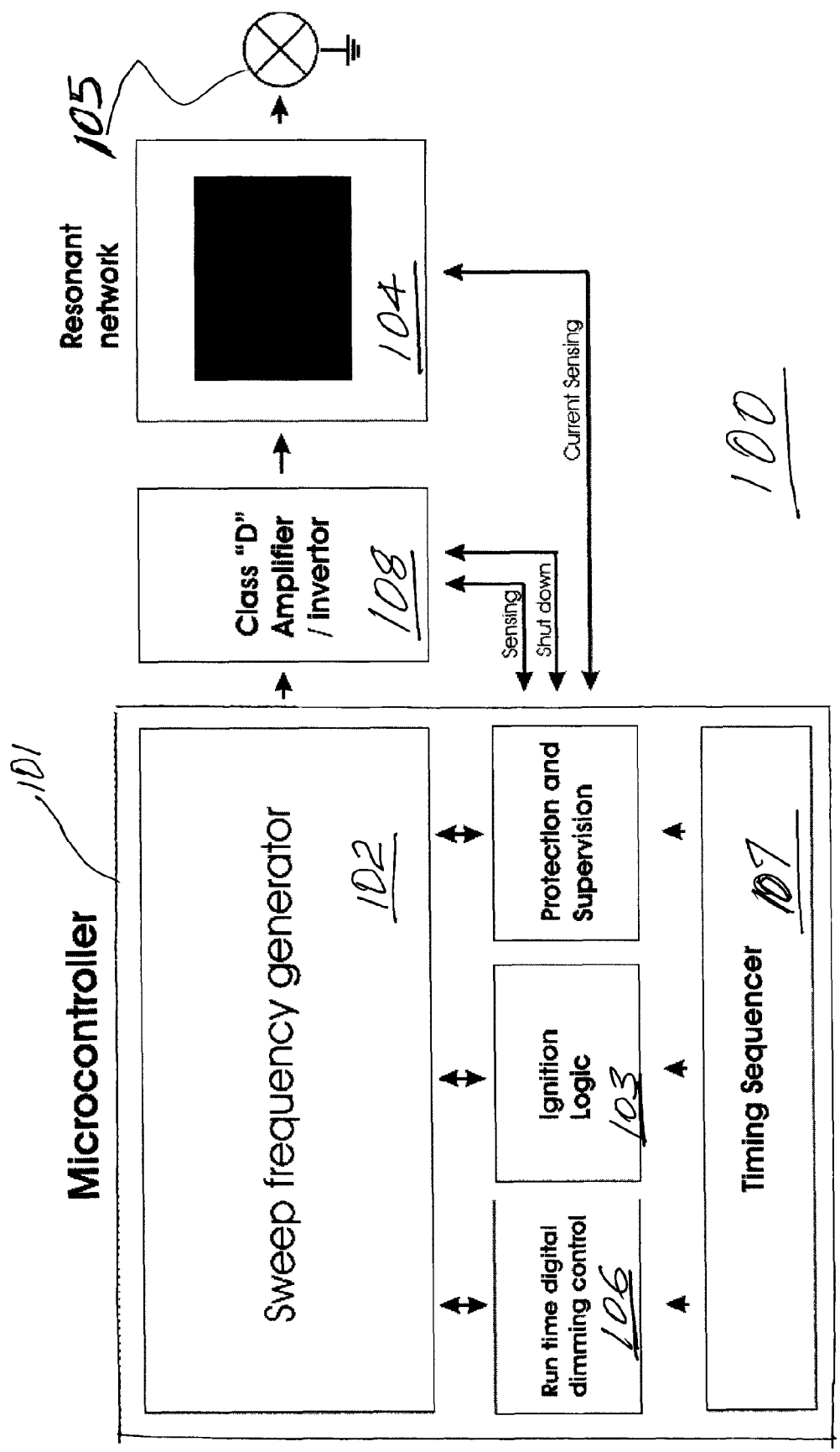
FIG. 1 is a block diagram illustrating conceptual components and functioning of the electronic ballast.

Referring to FIG. 1, an electronic ballast of a high intensity discharge lamp is denoted generally at 100. The electronic ballast may comprise a separate unit electrically coupled to the lamp, or may be enclosed in a unitary lamp module.

Upon power-up the sweep frequency generator 102 within microcontroller 101 is controlled by ignition logic 102 to sweep through a range of frequencies in order to detect a resonant frequency in the resonant ignition network 104 of high intensity discharge lamp 105. Sweep frequency generator 102 may comprise a voltage controlled oscillator, for instance.

If resonance is detected, run time digital control 106 commences, and maintains the power to lamp 105 according to the power profile provided by timing sequencer 107.

Resonant ignition network 104 transmits power for the ignition process in the lamp 105, and in general regulates current and voltage applied to the lamp, aided by amplifier/inverter 108.

If the lamp 105 fails to achieve ignition, or is disconnected for any reason, protection and supervision block 108 detects such condition, and timing sequencer 107 will re-attempt ignition after a pre-determined time interval. The timing sequencer may be programmed so that different power profiles are accommodated for different lamp types.

Figure 2:
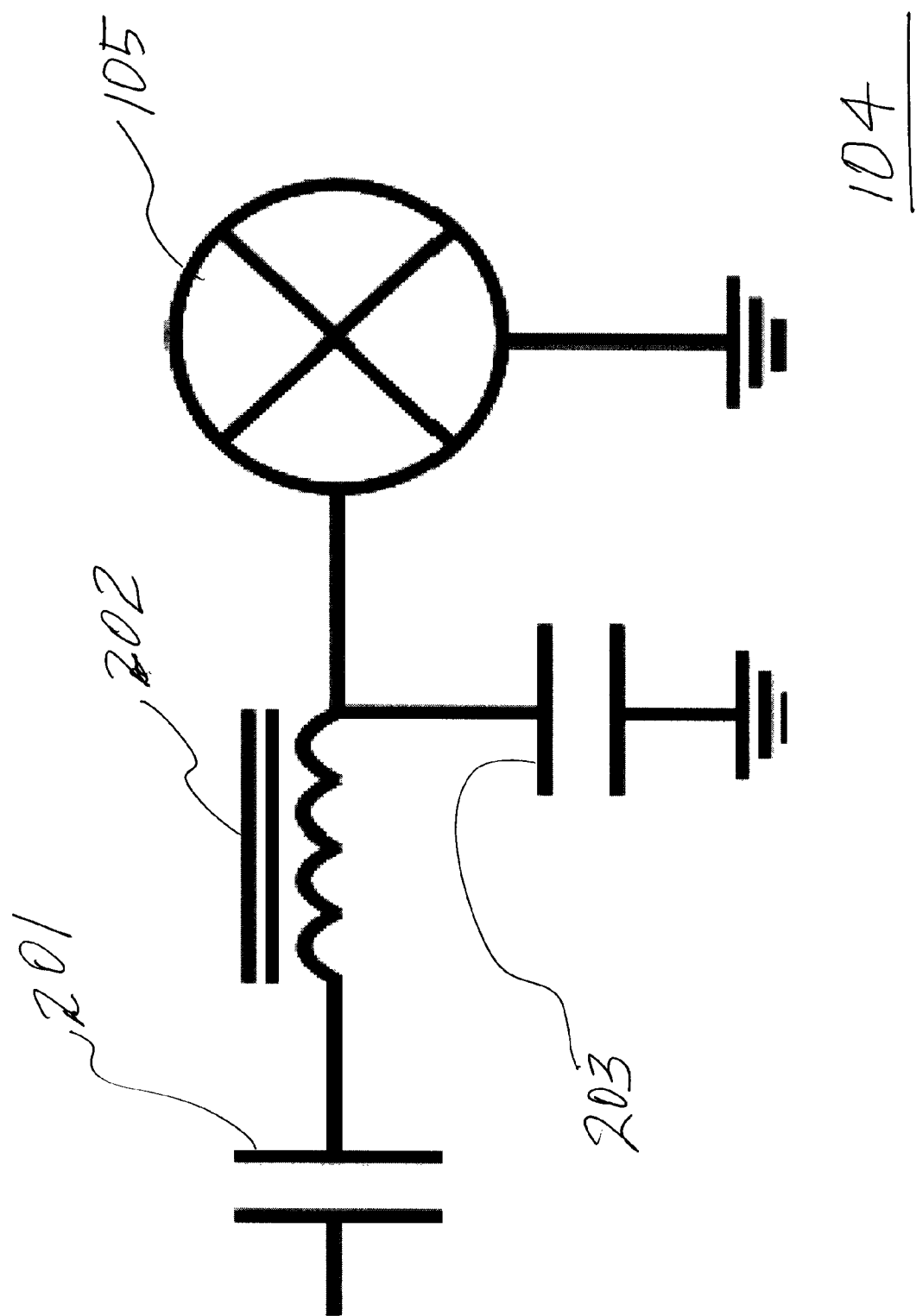
FIG. 2 is a circuit diagram illustrating additional functional detail embodied in the resonant ignition network of the electronic ballast.

FIG. 2 further illustrates typical circuit detail of resonant ignition network 104. Capacitor 201 is coupled in series with inductor 202. Lamp 105 is coupled across inductor 202 and a grounded capacitor 203. Lamp 105 is separately grounded. Additional components (not shown) may be optionally used to sense lamp 105 achieving the ignition state. The sensing mechanisms may be temperature based, via a thermistor, for example. Or they may be voltage-based, where a change in voltage is detected. Upon sensing the onset of lamp ignition, the capacitive reactive components of resonant ignition network 104 may be shunted to drop the operating frequency significantly to a range that is more appropriate for steady state operation of lamp 105, typically between 20 and 100 kHz, to be commensurate with a drop in voltage applied, again to a level suitable for steady state operation.

Figure 3:
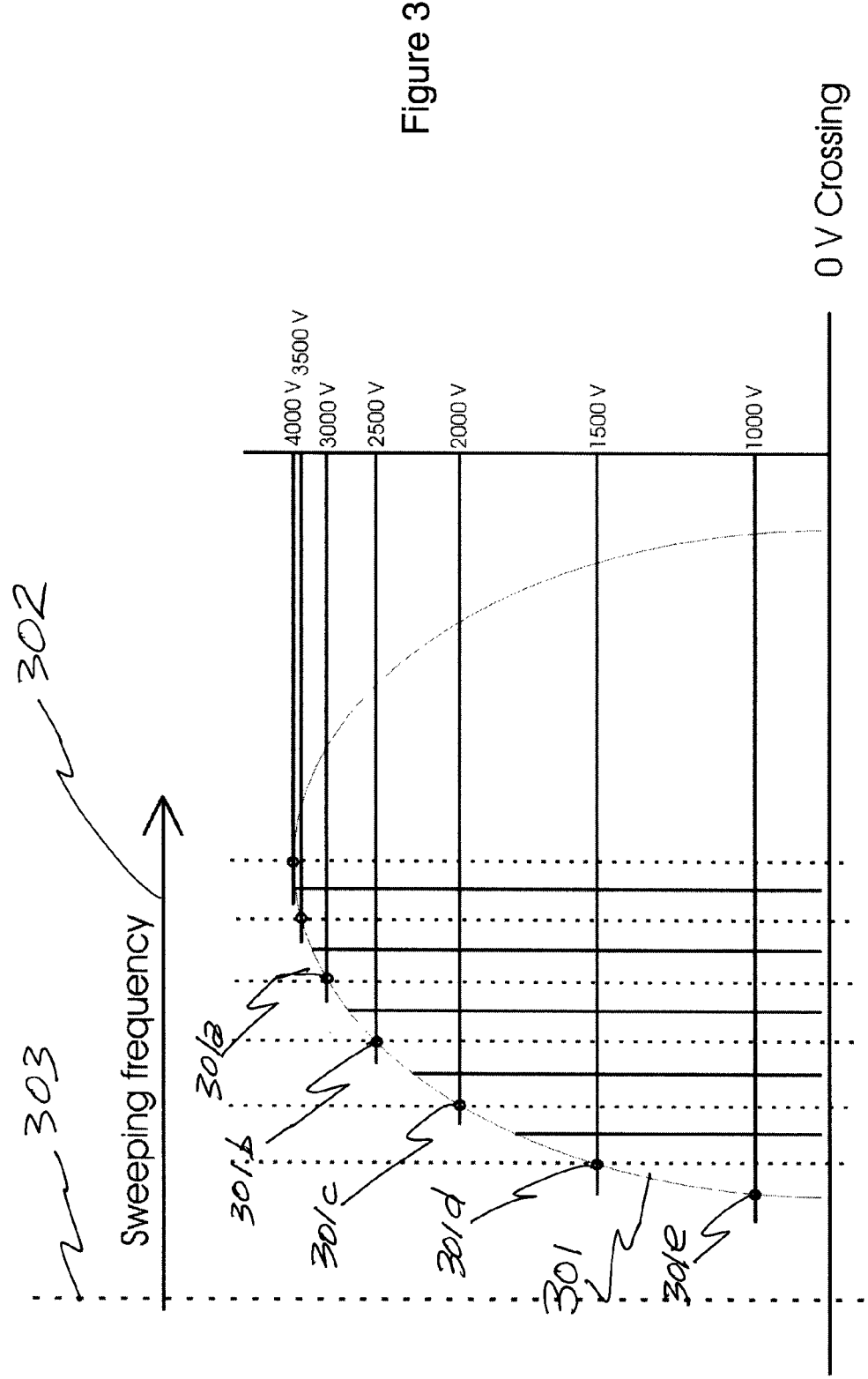
FIG. 3 is a representative diagram illustrating frequency sweeping operation of the resonant ignition network of the electronic ballast to achieve lamp ignition at an optimal voltage.

FIG. 3 is a representative diagram illustrating frequency sweeping operation of the resonance ignition ballast circuit 200 to achieve lamp ignition at an optimal lamp ignition voltage inherent to a particular lamp.

The voltage applied, which is proportional to the energy applied, for striking ignition of the lamp at depends upon the volume and density of the gas therein and the operational temperature of the lamp. When the lamp is cumulatively used in normal operation, the amount of gas originally enclosed therein is gradually depleted, at least partly as a result of thermo-chemical interactions with particulate matter from electrode sputtering within the lamp.

The electrical energy, via the high ignition voltage spike, required at ignition to initiate thermionic emission is proportional to the density of the gas in the lamp. Consequently, as the lamp is cumulatively operated and the contained gas gradually and cumulatively depleted, proportionately less electrical energy will be required to achieve lamp ignition. Looked at another way, successively lower levels of voltage spikes are needed to achieve the optimal lamp ignition, depending on inherent lamp properties, including amount of gas enclosed and lamp temperature, associated with operation of the lamp. Therefore there is no need to always apply what amounts to an excessively-spiking, damaging, pre-determined high voltage spike, such as around the 5 kV level, to reach lamp ignition.

The resonant ignition network 200 allows the electronic ballast described herein to take advantage of the inherent ignition voltage of a given lamp, as depicted at 300 for the frequency sweeping operation to energize the lamp to achieve its inherent ignition voltage. Depending on the density of gas in the lamp, which in turn depends on the lamp usage history as discussed above, the inherent ignition voltage will lie along ignition voltage curve 301. For instance, a new lamp may have an inherent ignition voltage of 3 kV, represented as point 301a along ignition voltage curve 301. As the lamp is operated on an ongoing basis, and the gas enclosed therein is cumulatively depleted, the inherent ignition voltage may gradually transition along successively lower ignition voltage points coinciding with 301b, then to 301c, then to 301d, then to 301e, for example.

The frequency sweeping step 302 is initiated at the sweep frequency generator 102 within electronic ballast 100. Starting from a selected frequency, for instance around 200 MHz, the frequency is continuously decreased to successively lower levels, such as towards a lower end target of about 120 MHz. As the frequency is swept from the high towards the successively lower frequencies, the voltage applied to the lamp increases in an inverse proportional relationship. Thus the voltage, and power, applied to the lamp increases continuously until it reaches the respective and inherent ignition voltage of the lamp, which may be any point along the ignition voltage curve 301. As discussed above, the particular point at which lamp ignition is triggered depends on the cumulative operating history of the lamp, more specifically the density of the gas enclosed therein.

In this manner, the electronic ballast 100 provides for ignition of the lamp at the inherent ignition voltage of the lamp, and avoids continually over-spiking the lamp's electrodes with an intense 5 kV-like impulsive voltage during operation startup. Thus adverse consequences such as stress and damage to the lamp electrodes including associated lamp hardware circuitry such as connectors, excessive gas depletion, excessive power consumption, decreased lamp life and decreased lighting efficiency are significantly minimized by striking ignition at the relatively lower inherent ignition voltage of the lamp.

Figure 4:
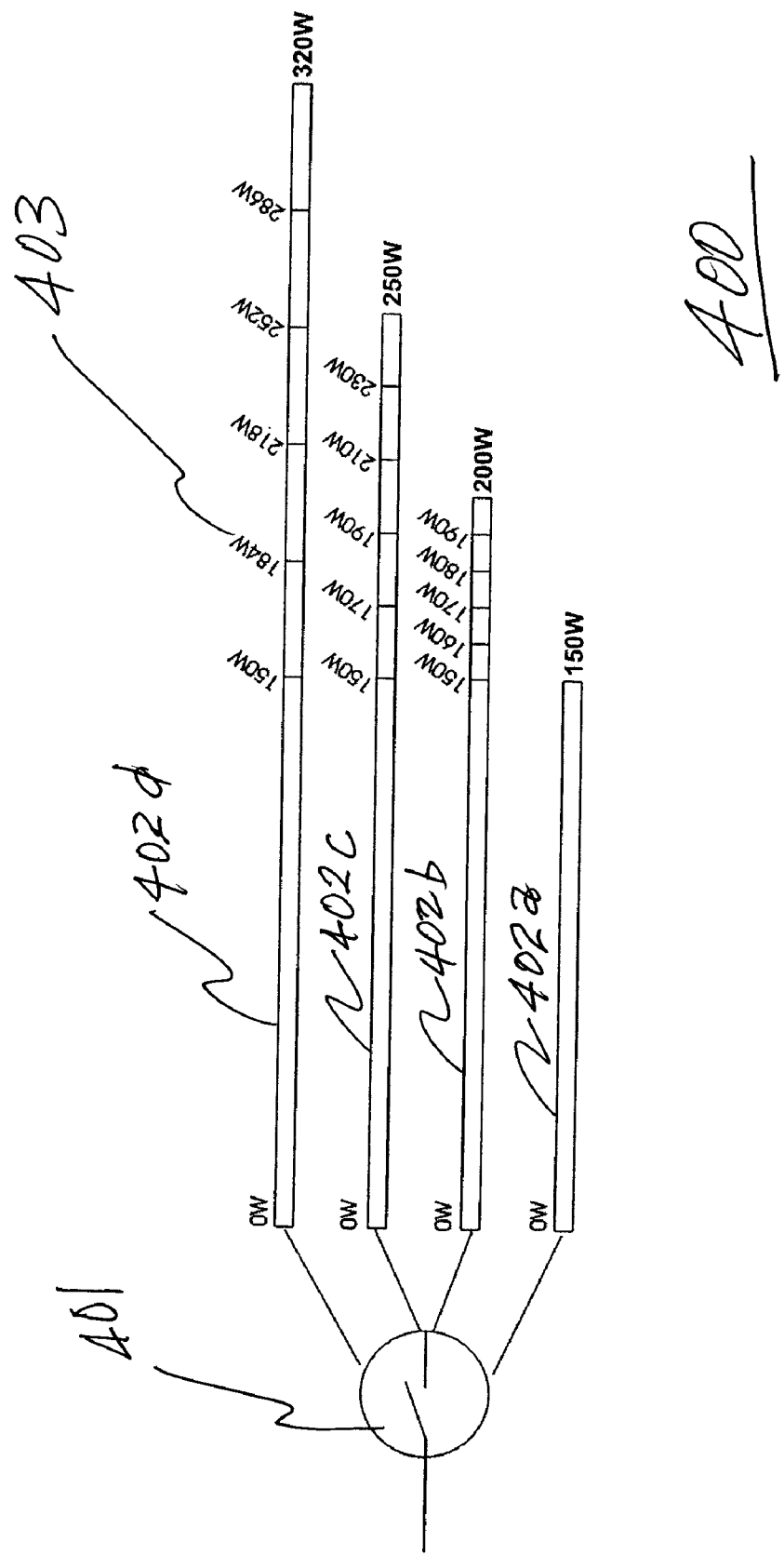
FIG. 4 is an optional embodiment of the electronic ballast that may incorporate a circuit feature of selectable lamp wattage level.

FIG. 4 is a further embodiment of the electronic ballast that may incorporate a circuit feature of selectable lamp wattage level. Multiplexing switch 401 allows selection of any one of several lamps 402a-402d via ballast 100. Lamps 402a-402d may have various wattage levels that coincide with the most commonly desirable or available lamp wattages in the commercial market. Each lamp may further include capability for dimming to selected wattage level 403.

Although preferred embodiments of the invention have been described herein, it will be understood by those skilled in the art that variations may be made thereto without departing from the scope of the appended claims.

What is claimed is:

1. A method of operating an electronic ballast of a high intensity discharge lamp to achieve ignition in the lamp, the method comprising:
   selecting a starting frequency for a sweep frequency generator electrically coupled to a resonant ignition network of the electronic ballast; and
   starting generally from the starting frequency, operating the sweep frequency generator to apply a continuously decreasing frequency to the resonant ignition network, the resonant ignition network operable to provide electrical power to the lamp, until an ignition voltage sufficient to achieve ignition in the lamp is reached.

2. The method of claim 1 further comprising:
   in response to achieving ignition, decreasing the ignition voltage to a steady state voltage level appropriate for steady state operation of the lamp.

3. The method of claim 2, wherein decreasing the ignition voltage is achieved by decreasing the frequency of the sweep frequency generator.

4. The method of claim 1 further comprising:
   sensing ignition in the lamp; and
   decreasing the ignition voltage to a steady state voltage level appropriate for steady state operation of the lamp, in response to sensing ignition.

5. The method of claim 4 wherein sensing ignition comprises sensing a temperature level of the high intensity discharge lamp.

6. The method of claim 2 wherein sensing ignition comprises sensing a voltage change across at least one of a plurality of electronic components coupled to the lamp.

7. An electronic ballast for powering a high intensity discharge lamp, the electronic ballast comprising:
   a resonant ignition network operable to provide electrical power to the high intensity discharge lamp, the resonant ignition network being arranged to include the electrical load of the lamp; and
   a sweep frequency generator arranged to apply a continuously decreasing frequency to the resonant ignition network at least until an ignition voltage sufficient to achieve ignition in the lamp is reached.

8. The electronic ballast of claim 7 wherein the resonant ignition network is further operable to decrease the ignition voltage level applied to the lamp in response to lamp ignition being reached, the decreased voltage level being appropriate for steady state operation of the lamp.

9. The electronic ballast of claim 8 wherein decreasing the ignition voltage is achieved by decreasing the frequency of the sweep frequency generator as applied to the resonant ignition network.

10. The electronic ballast of claim 9 wherein the frequency of the resonant ignition network is decreased to a level generally around 120 kHz for steady state operation of the lamp.

11. The electronic ballast of claim 7 further comprising sensing circuitry arranged to sense when ignition in the lamp is achieved.

12. The electronic ballast of claim 11 wherein the sensing circuitry comprises a temperature sensing component to sense a temperature condition of the lamp that is indicative of lamp ignition being reached.

13. The electronic ballast of claim 11 wherein the resonant ignition network is further operable to decrease the ignition voltage level to a decreased voltage level appropriate for steady state operation of the lamp in response to sensing lamp ignition being reached.

14. The electronic ballast of claim 7 wherein the sweep frequency generator is arranged to apply a frequency that continuously decreases from a level starting generally around 200 MHz.

15. The electronic ballast of claim 7 further comprising a multiplexing switch circuit for selecting any one of a plurality of lamp wattage levels.

16. A high intensity discharge lamp module comprising:
   an electronic ballast for supplying an ignition voltage to energize a high intensity discharge to an ignited state; and
   a sweep frequency generator to apply a continuously decreasing frequency to a resonant ignition network of the electronic ballast, at least until an ignition voltage sufficient to achieve ignition of the lamp is reached.

17. The high intensity discharge lamp module of claim 16 wherein the sweep frequency generator comprises a voltage controlled oscillator.

18. The high intensity discharge lamp module of claim 16 wherein the sweep frequency generator continuously decreases the frequency applied to the resonant ignition network from around 200 MHz to around 120 MHz.

* * * * *